(No Model.) 2 Sheets—Sheet 1.
C. L. GOEHRING.
WOOD MOLDING MACHINE.
No. 361,868. Patented Apr. 26, 1887.
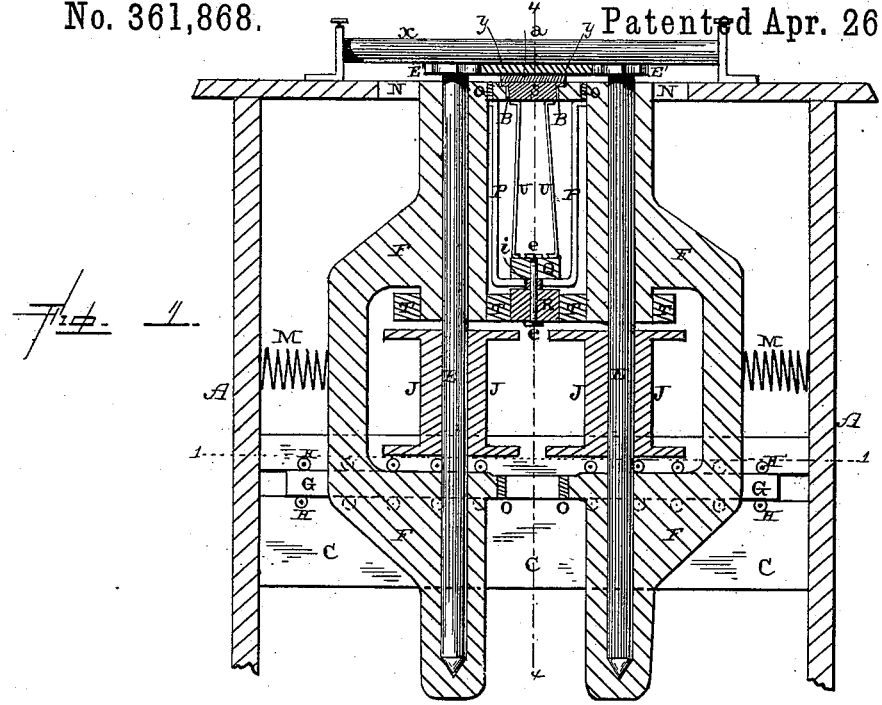
Fig. 1.
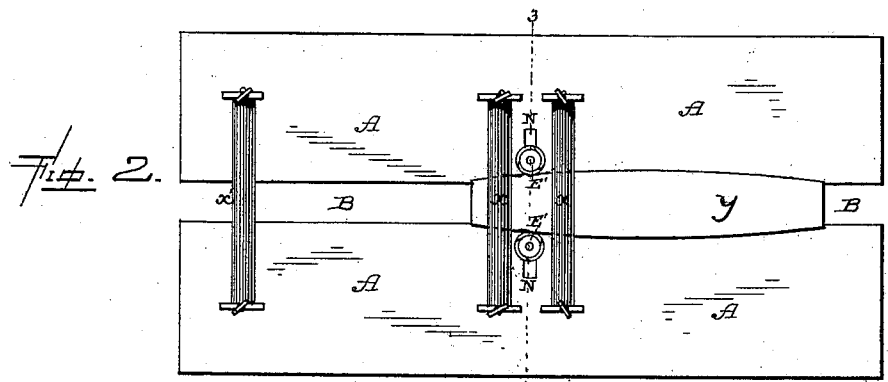
Fig. 2.
Fig. 3.
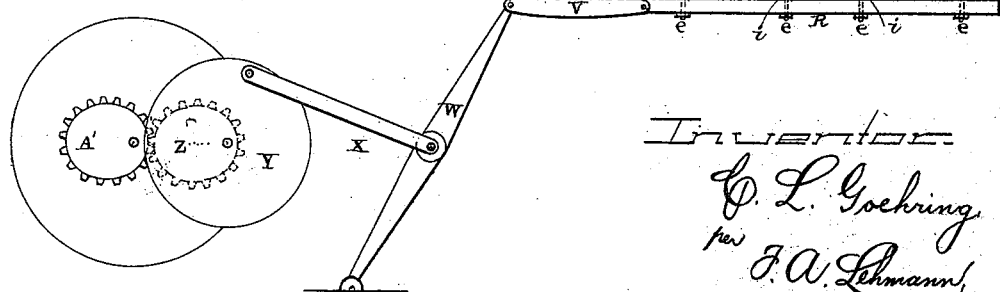
Witnesses
L. F. Gardner
A. W. Brecht
Inventor
C. L. Goehring
per J. A. Lehmann, atty.

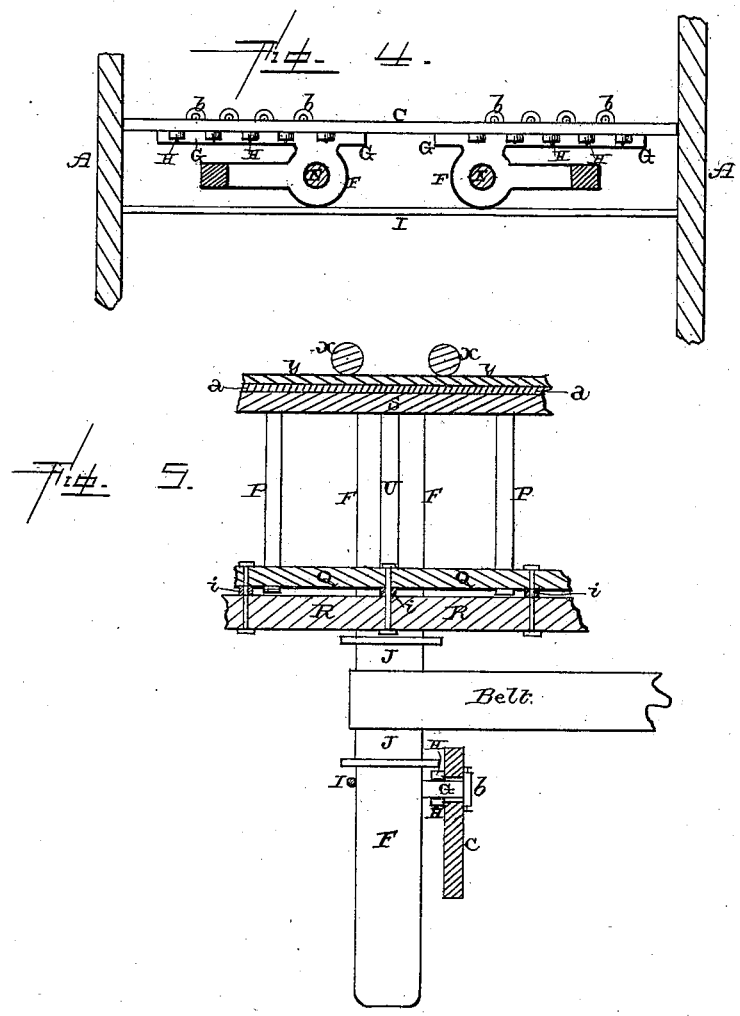

UNITED STATES PATENT OFFICE.

CHARLES L. GOEHRING, OF ALLEGHENY, PENNSYLVANIA.

WOOD-MOLDING MACHINE.

SPECIFICATION forming part of Letters Patent No. 361,868, dated April 26, 1887.

Application filed June 18, 1886. Serial No. 205,571. (No model.)

*To all whom it may concern:*

Be it known that I, CHARLES L. GOEHRING, of Allegheny, in the county of Allegheny and State of Pennsylvania, have invented certain new and useful Improvements in Wood-Molding Machines; and I do hereby declare the following to be a full, clear, and exact description of the invention, such as will enable others skilled in the art to which it pertains to make and use it, reference being had to the accompanying drawings, which form part of this specification.

My invention relates to an improvement in wood-molding machines; and it consists in the arrangement and combination of parts, which will be more fully described hereinafter, and set forth in the claims.

The object of my invention is to produce a wood-molding machine in which two revolving cutters are used, which are automatically adjustable in relation to each other, so that boards of any suitable width can have their opposite edges cut or molded to any desired pattern, and thus produce boards which are shaped like barrel-staves, or which have scalloped edges, or have their edges cut into irregular or regular forms of any kind that may be desired.

Figure 1 is a vertical section of a machine embodying my invention, taken through the bearings of the spindles on the dotted line 3 3 of Fig. 2. Fig. 2 is a plan view. Fig. 3 is a detached view of the pattern and work, their carriage, and the mechanism for moving them back and forth. Fig. 4 is a horizontal section taken on the line 1 1 of Fig. 1. Fig. 5 is a vertical section, taken on the line 4 4 of Fig. 1.

A represents a suitable table or frame-work, which is provided with a slot or opening, B, which extends from one end of the table to the other. Extending across this table is a suitable partition, C, which forms a support for the carriages of the two spindles, and which supports the carriages of the two spindles as they are moved horizontally back and forth in relation to each other. The two spindles E, carrying suitable cutters, E', upon their upper ends, are journaled in suitable carriages, F, as shown in Fig. 1, which carriages are provided with horizontal flanges G, which are made to catch in between the two sets of friction-rollers H, which are secured upon the partition C. These horizontal flanges G serve to support the carriages F in position between the rollers, and keep the carriages F always in a vertical position. The friction-rollers H allow the carriages to move back and forth with the least possible amount of friction. Upon the opposite side of the carriages from the partition C is placed the horizontal rod I, which extends across the table, and which keeps the carriages F in position. There is a tension exerted upon both of the spindles by the driving-belts which pass around the driving-pulleys J, and thus the carriages are always drawn toward the partition. On the outer side of the partition or support C, just opposite the slot, are journaled a suitable number of vertical friction-rollers, b, against which the edges of the flanges G bear, so as to prevent this tension of the belts upon the carriages from binding the carriages against the partition, so that the spindles cannot freely move. The driving-belts pass above the partition C to the driving-shaft, which may be placed either upon the end of the table or at any other convenient point. Both spindles are driven at the same rate of speed, and are made automatically adjustable in relation to each other, for the purpose of allowing the cutters to follow all the variations in the shape of the pattern R.

Both of the carriages F have openings or recesses made in their inner sides, as shown in Fig. 1, so as to receive the pulleys J, by which the spindles are driven.

Placed between the inner sides of the table and the outer sides of the carriages are the springs M, which serve to keep the carriages and the spindles pressed inward toward each other, and so that the cutters E will open or close, according as the width of the pattern increases or diminishes. The upper ends of the carriages F of the spindles pass up into the slots N, which are made in the top of the table, for the purpose of allowing the cutters upon the spindles to approach and move away from each other.

When it is desired to limit the distance within which the cutters shall approach each other, suitable wedges, blocks, or stops, O, are placed in the slots, as shown in Fig. 1; also, placed between the carriages F, near their lower ends, are other stops O, which will be the same distance apart as those upon the top of the table, and which stops O also limit the movement of the spindles toward each other. The two sets of stops O are used for the purpose of bracing the carriages of the spindles alike at both ends, and thus prevent any strain, which would result if the stops were used at one point only when the pattern is not between them. When the pattern is between the carriages of the spindles, no stops are needed.

Secured to the under side of the top of the table, upon opposite sides of the slot or opening B, that is made from one end of the table to the other, are secured L-shaped hangers P, upon the lower ends of which is placed the endwise-moving rod or bar Q. Between the lower ends of these hangers there is left a sufficient space for suitable clamping-bolts, $e$, to pass through, which bolts serve to connect the pattern and the rod Q together. Both the rod Q and the pattern R have an endwise movement. The rod Q serves no other purpose than to support the pattern and connect it to the sliding plate S, which moves in the opening in the top of the table; but the pattern R serves to guide the movements of the two spindles in relation to each other.

In order to reduce the friction between the bearings F and the pattern R as much as possible, friction-rollers T are placed upon the carriages, and these friction-rollers bear against opposite edges of the pattern, as shown. As the pattern is forced back and forth between the rollers the spindles move in and out in relation to each other, according to the shape of the pattern, which may be the same upon both edges; or the edges may be of different shapes, as may be desired. One side of the pattern may be perfectly straight and the other curved or fluted, or one side may be tongued and the other grooved. In order to prevent the pattern from binding against the lower ends of the hangers P, suitable thimbles or sleeves, $i$, of any kind may be placed upon the bolts $e$, which connect the rod Q and pattern R together, and these thimbles, catching between the edges of the hangers P, prevent the slightest lateral play or movement of the pattern.

Projecting upward from the top of the rod or bar Q are the supports U, which are attached at their upper ends to the slide or plate S, which moves in the slot made in the top of the table, and upon the top of this plate S is bolted a plate, $a$, upon the top of which is placed the board or piece of wood $y$ to be operated upon by the cutters. The boards $y$ being operated upon by the cutters are held down in contact with the plate $a$ upon the plate S by means of suitable rollers, $x$, in the usual manner. Another roller, $x'$, is placed at the end of the table, so as to carry away the pieces as fast as they are finished.

Connected directly to one end of the pattern is a connecting-rod, V, which rod has its other end connected to the upper end of the lever W, which is pivoted to suitable bearings upon the floor. The upper end of the lever W is in a direct line with the center of the slide R, and hence it moves freely between the lower ends of the hangers P as it is worked back and forth. Connected to this lever W, near its center, is a connecting-rod, X, which has its other end fastened to the wheel Y, near its edge. To this wheel Y is secured an eccentric gear, Z, and meshing with this gear Z is an eccentric gear, A'. These two gears Z A' are so shaped that they will move the pattern comparatively slowly forward, so as to give the cutters ample time to act upon the board, but draw the pattern rapidly backward, so as to receive a fresh board. This quick return movement of the pattern saves just so much time in the operation of the machine. The upper end of the lever, which is pivoted upon the floor, catches between the edges of the two hangers P, and is thus prevented from having any lateral play in its movements.

A fly-wheel will be placed upon the shaft of the eccentric A', so as to give the pattern mechanism a steady motion.

Having thus described my invention, I claim—

1. In a wood-molding machine, the combination of the frame A, having the slot or opening B in its top, the two carriages F, provided with supporting-flanges G upon one side, the spindles E, carried by the carriages, the springs M, applied to the outer sides of the carriages, so as to force them toward each other when left free to move, the pulleys on the spindles, the slotted partition in which the flanges G catch, and a rod, I, placed upon the opposite side of the carriages from the partition, substantially as shown.

2. In a wood-molding machine, the combination of the frame A, having the slots or openings B N in its top, which slots extend at an angle to each other, the independent carriages F, carrying the spindles E and cutters, and provided with the supporting-flanges G, near their lower ends, the springs M, for forcing the carriages toward each other, the pattern R, which is placed between the carriages, and the friction-rollers T, placed upon the carriages to bear against opposite sides of the pattern, and the slotted partition C, by means of which the carriages are supported, the upper ends of the carriages being held in and having a reciprocating motion in the slots N, substantially as described.

3. In a wood-molding machine, the combination of the table or frame having the longitudinal slot B in its top, for the slide S to move in, and the transverse slots N, for the upper ends of the spindles to move in, the slide S, supports P U, endwise-moving rod Q, secured to the supports U, the two laterally-adjustable carriages, the springs M, applied to their outer sides, the spindles journaled in the carriages and provided with the driving-pulleys and cutters, the endwise-moving pattern secured to the rod Q, a mechanism for moving the pattern, rod, and slide back and forth, and supports upon which the carriages move back and forth, substantially as set forth.

4. The combination of the carriages F, having suitable recesses made in their inner sides to receive the driving-pulleys J, and provided with supporting-flanges G upon one side, the friction-rollers T, applied to the carriages above the pulleys, the pattern R, placed in between the friction-rollers T, the rod Q, secured to the pattern, the supports P, which support the rod and the pattern in position, the slide S, the rods U, which connect the rod Q and the slide S together, the plate $a$, the spindles provided with cutters at their upper ends, and the driving-pulleys J, journaled in the carriages, and the slotted partition C, provided with friction-rollers for the supporting-flanges to bear against, substantially as specified.

5. In a wood-molding machine, the combination of the carriages, which are laterally adjustable in relation to each other, the spindles E, journaled in the carriages and provided with cutters at their upper ends, and the driving-pulleys J, the springs M, applied to the outer sides of the carriages for the purpose of forcing them inward in relation to each other, the friction-rollers T, applied to the carriages, pattern R, placed between the friction-rollers, the rod Q, rigidly secured to the pattern, the supports P, which support the rod and pattern in position, the slide S, the rods U, which connect the rod Q and the slide S together, the plate which is secured upon the top of the slide, the rollers $x$, and a mechanism, substantially as described, for moving the rod Q and pattern R and their attachments back and forth between the two carriages, the slotted partition C, and the supporting-flanges secured to the carriages, substantially as shown.

6. In a wood-molding machine, the combination of the frame A, having the longitudinal opening B in its top, the slide S, placed in this opening and carrying the plate $a$, the stationary supports P, secured to the frame, the movable connection U, which connects the slide and the rod Q together, the pattern R, rod Q, connected thereto, the laterally-adjustable carriages, the spindles carried thereby and provided with cutters at their upper ends, and the driving-pulleys J, the connecting-rod V, fastened to one end of the pattern, the lever W, and a mechanism, substantially as shown, for moving the lever W back and forth, substantially as described.

In testimony whereof I affix my signature in presence of two witnesses.

C. L. GOEHRING.

Witnesses:
F. A. LEHMANN,
L. F. GARDNER.